United States Patent
Fujiyama et al.

(10) Patent No.: US 8,253,834 B2
(45) Date of Patent: Aug. 28, 2012

(54) IMAGE PICKUP APPARATUS AND REFERENCE POSITION DETECTION METHOD

(75) Inventors: Michihiro Fujiyama, Kyotanabe (JP); Rika Okada, Daito (JP); Fumitaka Joo, Daito (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 149 days.

(21) Appl. No.: 12/914,340

(22) Filed: Oct. 28, 2010

(65) Prior Publication Data

US 2011/0102655 A1    May 5, 2011

(30) Foreign Application Priority Data

Oct. 29, 2009    (JP) ................................ 2009-249512

(51) Int. Cl.
- H04N 5/335 (2011.01)
- H04N 5/222 (2006.01)
- H04N 5/225 (2006.01)
- H04N 17/02 (2006.01)

(52) U.S. Cl. ........ 348/302; 348/370; 348/371; 348/294; 348/207.99; 348/180; 348/187

(58) Field of Classification Search .......... 348/302, 348/370, 371, 294, 207.99, 180, 187
See application file for complete search history.

(56) References Cited

U.S. PATENT DOCUMENTS

| | | | | |
|---|---|---|---|---|
| 2001/0046315 A1* | 11/2001 | Sentoku et al. | ............... | 382/151 |
| 2002/0025164 A1* | 2/2002 | Suzuki | ............ | 396/429 |
| 2007/0065135 A1* | 3/2007 | Takei et al. | ............. | 396/241 |
| 2011/0013200 A1* | 1/2011 | Kato | ............. | 356/625 |

FOREIGN PATENT DOCUMENTS

| | | |
|---|---|---|
| JP | 2001-117129 A | 4/2001 |
| JP | 2006-201306 A | 8/2006 |
| JP | 2007-315982 A | 12/2007 |
| JP | 2008-042257 A | 2/2008 |

* cited by examiner

*Primary Examiner* — Chieh M Fan
*Assistant Examiner* — Quang Le
(74) *Attorney, Agent, or Firm* — Westerman, Hattori, Daniels & Adrian, LLP

(57) ABSTRACT

An image pickup apparatus includes: a photoelectric transduction portion to transduce an optical image of a subject formed on an image plane through a lens to output an image signal; a movement portion provided between the photoelectric transduction portion and a base to move the photoelectric transduction portion relative to the base; an illumination portion placed at a predetermined position from the base to emit light onto the image plane of the photoelectric transduction portion in a state in which a shutter is closed to block light entering from the lens; a light-blocking portion placed at a predetermined position from the base to interrupt part of light from the illumination portion at between the illumination portion and the image plane; an adjustment image obtaining portion to obtain an image signal output by the photoelectric transduction portion as a result of photoelectric transduction, in a state in which the illumination portion emits light; and a relative position detection portion to detect a relative position of the photoelectric transduction portion with respect to the base, based on an image of the light-blocking portion that is included in an image based on the obtained image signal.

16 Claims, 7 Drawing Sheets

IMAGE PICKUP APPARATUS AND REFERENCE POSITION DETECTION METHOD

This application is based on Japanese Patent Application No. 2009-249512 filed with Japan Patent Office on Oct. 29, 2009, the entire content of which is hereby incorporated by reference.

BACKGROUND OF THE INVENTION

1. Field of the Invention

The present invention relates to an image pickup apparatus and a reference position detection method, and more particularly to an image pickup apparatus with an image stabilization function and a reference position detection method executed in the image pickup apparatus.

2. Description of the Related Art

An image pickup apparatus, typically, a digital still camera, held by a user to shoot an image includes an image stabilization function for reducing instabilities of images formed on a photoelectric transducer due to hand shake. The image stabilization function allows the photoelectric transducer to move in parallel with a plane vertical to an optical axis of a lens thereby reducing movement of an image formed on an image plane of the photoelectric transducer. In the initial setting, the photoelectric transducer is usually positioned at a reference position where the center of the photoelectric transducer coincides with the optical axis of the lens, so that the photoelectric transducer is efficiently moved.

A stage apparatus for positioning a photoelectric transducer at a reference position is known. The stage apparatus includes a fixed support substrate, an XY moving member supported on the fixed support substrate to be movable linearly in particular X and Y directions, which are orthogonal to each other and parallel to the fixed support substrate, and an X-direction position detection means for detecting a relative position in the X-direction of the XY moving member with respect to the fixed support substrate. The X-direction position detection means includes an X light source, an X light-receiving member having a light-received position that can be recognized in the X direction, and a calculation means for calculating the relative position in the X direction of the XY moving member with respect to the fixed support substrate, based on the light-received position of the X light-receiving member. The X light source and the X light-receiving member are fixed side-by-side in the X direction on the fixed support substrate. An X reflection member is fixed on the XY moving member to reflect light emitted from the X light source to introduce the reflected light to the X light-receiving element.

The conventional stage apparatus, however, has a problem in that a pair of the light source and the light-receiving element has to be provided each in the X direction and the Y direction. Furthermore, it is difficult to set a threshold value to adapt to changing environments including temperature, etc. depending on the characteristics of the light source and the light-receiving element. Moreover, in the initial setting, the photoelectric transducer has to be moved to the reference position through the steps of moving the photoelectric transducer to a position detected by the pair of the light source and the light-receiving member and of moving it to the reference position. It thus takes much time to move the photoelectric transducer to the reference position.

A measurement apparatus is also known, which includes a measurement unit for measuring, based on image data output from an image sensor in a camera module, the distance between the position of the central light-receiving element of a plurality of light-receiving elements of the image sensor and the position of the center of the optical axis of an optical system in the camera module on the image sensor. The measurement unit executes: a luminance information obtaining process of obtaining, from the image data, first luminance information for each pixel belonging to a first group of pixels arranged along a first direction in an image of the image data and second luminance information for each pixel belonging to a second group of pixels arranged along a second direction orthogonal to the first direction in said image; a center position specifying process of specifying the position of the center of the optical axis on the image sensor based on both luminance information; and a measurement process of measuring the above-noted distance by assuming the position of the central pixel in the image as the position of the central light-receiving element.

However, the image sensor has to be illuminated with predetermined light. Therefore, although the above-noted apparatus can be applied to an adjustment process in the production line, it cannot be applied during the actual use of the digital still camera, because the image sensor cannot be illuminated with predetermined light outside of the production line.

SUMMARY OF THE INVENTION

In accordance with an aspect of the present invention, an image pickup apparatus includes: a photoelectric transduction portion to transduce an optical image of a subject formed on an image plane through a lens to output an image signal; a movement portion provided between the photoelectric transduction portion and a base to move the photoelectric transduction portion relative to the base; an illumination portion placed at a predetermined position from the base to emit light onto the image plane of the photoelectric transduction portion in a state in which a shutter is closed to block light entering from the lens; a light-blocking portion placed at a predetermined position from the base to interrupt part of light from the illumination portion at between the illumination portion and the image plane; an adjustment image obtaining portion to obtain an image signal output by the photoelectric transduction portion as a result of photoelectric transduction, in a state in which the illumination portion emits light; and a relative position detection portion to detect a relative position of the photoelectric transduction portion with respect to the base, based on an image of the light-blocking portion that is included in an image based on the obtained image signal.

In accordance with another aspect of the present invention, an image pickup apparatus includes: a photoelectric transduction portion to transduce an optical image of a subject formed on an image plane through a lens to output an image signal; a movement portion provided between the photoelectric transduction portion and a base to move the photoelectric transduction portion relative to the base; a spotlight illumination portion placed at a predetermined position from the base to emit spotlight onto the image plane of the photoelectric transduction portion in a state in which a shutter is closed to block light entering from the lens; an adjustment image obtaining portion to obtain an image signal output by the photoelectric transduction portion as a result of photoelectric transduction, in a state in which the spotlight illumination portion emits spotlight; and a relative position detection portion to detect a relative position of the photoelectric transduction portion with respect to the base, based on an image of spotlight included in an image based on the obtained image signal.

In accordance with a further aspect of the present invention, a reference position detection method is executed in an image pickup apparatus. The image pickup apparatus includes a photoelectric transduction portion to transduce an optical image of a subject formed on an image plane through a lens to output an image signal, a movement portion provided between the photoelectric transduction portion and a base to move the photoelectric transduction portion relative to the base, an illumination portion placed at a predetermined position from the base to emit light onto the image plane of the photoelectric transduction portion in a state in which a shutter is closed to block light entering from the lens, and a light-blocking portion placed at a predetermined position from the base to interrupt part of light from the illumination portion at between the illumination portion and the image plane. The method includes the steps of; obtaining an image signal output by the photoelectric transduction portion as a result of photoelectric transduction in a state in which the illumination portion emits light; and detecting a relative position of the photoelectric transduction portion with respect to the base, based on an image of the light-blocking portion that is included in an image based on the obtained image signal.

The foregoing and other features, aspects and advantages of the present invention will become more apparent from the following detailed description of the present invention when taken in conjunction with the accompanying drawings.

DESCRIPTION OF THE PREFERRED EMBODIMENTS

In the following, an embodiment of the present invention will be described with reference to the figures. In the following description, the same parts are denoted with the same reference numerals. Their names and functions are also the same. Therefore, a detailed description thereof will not be repeated.

In the present embodiment, a digital still camera will be described as an example of an image pickup apparatus. The image pickup apparatus is not limited to a digital still camera and may be, for example, a video camera, a mobile phone, or a music player as long as the device has an image stabilization function.

Figure 1:
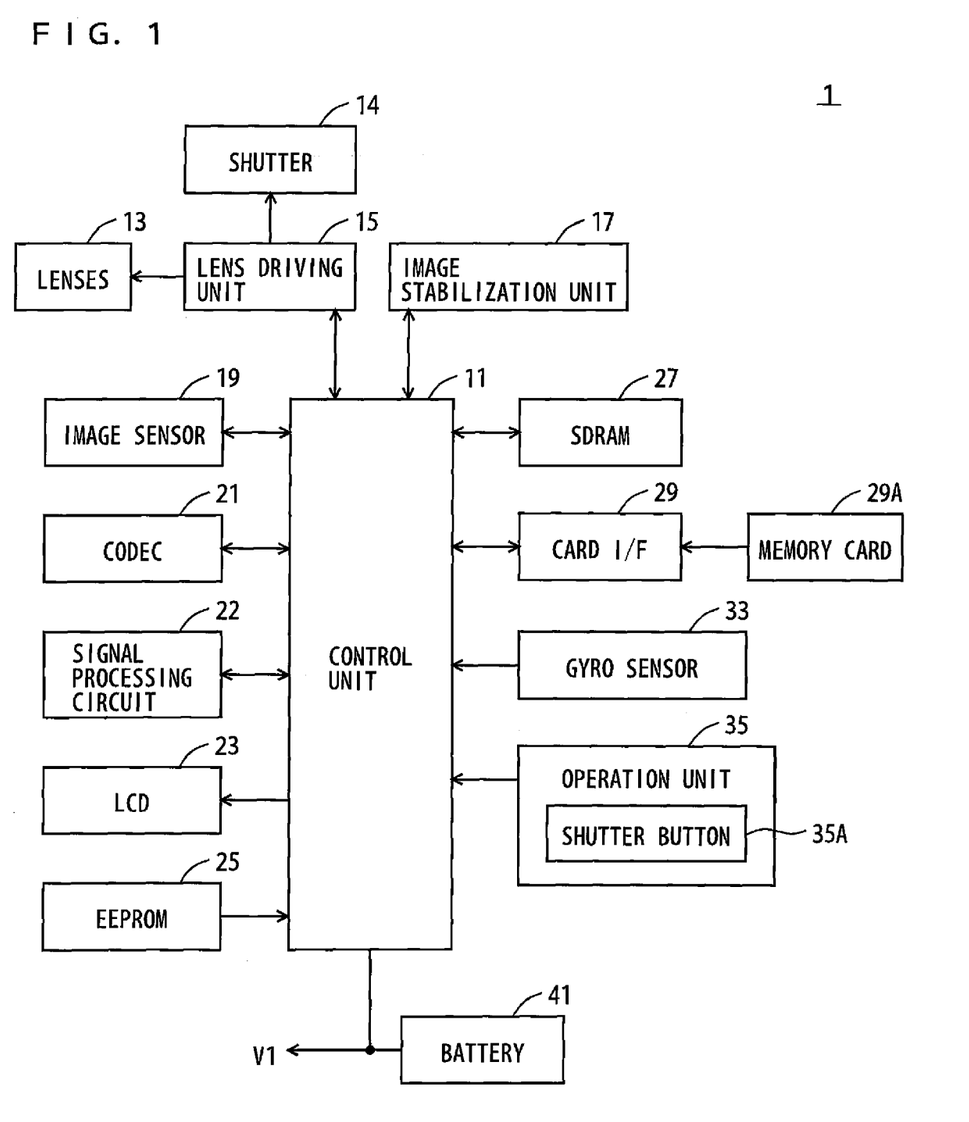
FIG. 1 is a block diagram schematically showing a configuration of a digital still camera in accordance with an embodiment of the present invention.

FIG. 1 is a block diagram schematically showing a configuration of a digital still camera. Referring to FIG. 1, a digital still camera 1 includes a control unit 11 for controlling the entire digital still camera 1, lenses 13 including a focus lens and a zoom lens, a shutter 14, a lens driving unit 15 for driving lenses 13 and shutter 14, an image stabilization unit 17, an image sensor 19, a codec 21, a signal processing circuit 22 for processing an image, an LCD (liquid crystal display) 23, an EEPROM (Electrically Erasable and Programmable Read Only Memory) 25 for storing a program to be executed by control unit 11, an SDRAM (Synchronous Dynamic Random Access Memory) 27 used as a work area of control unit 11, a card I/F (interface) 29 to which a memory card 29A is attached, a gyro sensor 33, an operation unit 35 for accepting a user's operation, and a battery 41 for feeding electric power to the entire digital still camera 1.

Lenses 13 are provided on the front face of the body of digital still camera 1. LCD 23 is provided on the back face of digital still camera 1, opposite to the surface on which lenses 13 are provided. Lenses 13 are controlled by lens driving unit 15. Lenses 13 have a zoom mechanism for adjusting the zoom lens.

Image sensor 19 is a photoelectric transducer such as a COMS (Complementary Metal Oxide Semiconductor) image sensor having an image place vertical to the optical axis of lenses 13. Image sensor 19 transduces an optical image of a subject, which is formed on the image plane through lenses 13, and then outputs image data to control unit 11. Control unit 11 accepts the image data output from image sensor 19 and stores the image data into SDRAM 27. The image data here is, for example, bitmap data formed of R (red), G (green), B (blue) per pixel. Image sensor 19 is not limited to a CMOS image sensor and may be a CCD (Charge Coupled Device) image sensor. In such a case, a CCD image sensor outputs an analog signal, which is then converted by an analog-to-digital converter into digital image data. It is noted that digital image data output by a CMOS image sensor as the photoelectric transducer and an analog signal output by a CCD image sensor as the photoelectric transducer are collectively referred to as an image signal.

Image sensor 19 is controlled by control unit 11. The time for photoelectric transduction is controlled. Specifically, in allowing image sensor 19 to start photoelectric transduction, control unit 11 allows lens driving unit 15 to open shutter 14 provided between lenses 13 and image sensor 19. Accordingly, image sensor 19 starts photoelectric transduction. If the time for photoelectric transduction has passed, control unit 11 allows lens driving unit 15 to close shutter 14 and allows image sensor 19 to output image data.

In picking up moving images, image sensor 19 outputs one-frame image data at prescribed time intervals. A frame is a unit of forming moving images and one frame means one image. A frame may be replaced by a field. A prescribed time interval is ⅕ second, if the frame rate is 5 FPS.

Signal processing circuit 22 reads out image data stored in SDRAM 27 and performs a variety of signal processing on the image data to convert the image data into a YUV format, which is a colorimetric system represented by a luminance signal and a color difference signal. Signal processing circuit 22 stores the image data in a YUV format into SDRAM 27.

Control unit 11 generates an RGB signal from the image data in a YUV format stored in SDRAM 27 and outputs the generated RGB signal to LCD 23. Accordingly, an image of a subject, which is picked up and output by image sensor 19, is displayed on LCD 23. In place of LCD 23, an organic EL (Electro Luminescence) display may be used.

Codec 21 is controlled by control unit 11 to read the image data in a YUV format stored in SDRAM 27 for compression and encoding and stores the compressed and encoded image data into SDRAM 27. Here, the image data is compressed and encoded in a JPEG format. When storing moving images, codec 21 compresses and encodes a plurality of frames in an MPEG (Moving Picture Experts Group) format. In this case, the encoded data, which is compressed and encoded by GOP (Group of Picture) by GOP, is stored in SDRAM 27. The technique of compressing and encoding image data or moving images is not limited and any other formats may be used.

Gyro sensor 33 detects an angular velocity of rotation of the body of digital still camera 1. Here, given that the horizontal direction is the X-axis, the vertical direction is the Y-axis, and the optical axis of the lenses is the Z-axis, gyro sensor 33 detects the angular velocity of the rotational direction around the Y-axis (yaw direction) and the angular velocity of the rotational direction around the X-axis (pitch direction) and outputs the respective angular velocities in the yaw direction and the pitch direction to control unit 11. Control unit 11 calculates the movement amount of the body in the X-axis direction based on the angular velocity in the yaw direction and calculates the movement amount of the body in the Y-axis direction based on the angular velocity in the pitch direction.

Image stabilization unit 17 moves image sensor 19 to minimize blur of the optical image formed on the image plane of image sensor 19. For this purpose, image stabilization unit 17 includes a driving portion corresponding to each of two directions, which are parallel to the image plane of image sensor 19 and cross each other, to move image sensor 19 in the two directions. Here, the two directions are the horizontal direction (the X-axis direction) and the vertical direction (the Y-axis direction) that are perpendicular to each other. The image plane of image sensor 19 is vertical to the optical axis of lenses 13. Image stabilization unit 17 moves image sensor 19 in the two directions parallel to the image plane of image sensor 19 and orthogonal to each other, thereby preventing blurring associated with camera shake during exposure of a subject image.

Image stabilization unit 17 moves image sensor 19 to the reference position when digital still camera 1 is powered on or when the operation mode switches from a replay mode to an image pickup mode. The reference position of image sensor 19 is here the center of the range over which image sensor 19 can move in the vertical and horizontal directions. When image sensor 19 is located at the reference position, the optical axis of lenses 13 is at the center of image sensor 19. It is noted that the reference position can be set arbitrarily.

Image stabilization unit 17 moves image sensor 19 such that the optical image formed on image sensor 19 after image sensor 19 is moved to the reference position is formed at the same position even when the body of digital still camera 1 moves. Specifically, in order to move image sensor 19, the direction parallel to the image plane of image sensor 19 and the correction amount are determined based on the angular velocities in the yaw direction and the pitch direction as detected by gyro sensor 33. Here, a driving unit for rotating image sensor 19 around the optical axis of lenses 13 may be additionally provided so that image sensor 19 is rotated in addition to being moved parallel.

Memory card 29A including a non-volatile memory is attached to card I/F 29. Control unit 11 can access memory card 29A through card I/F 29 and stores the encoded data stored in SDRAM 27 into memory card 29A.

Figure 2:
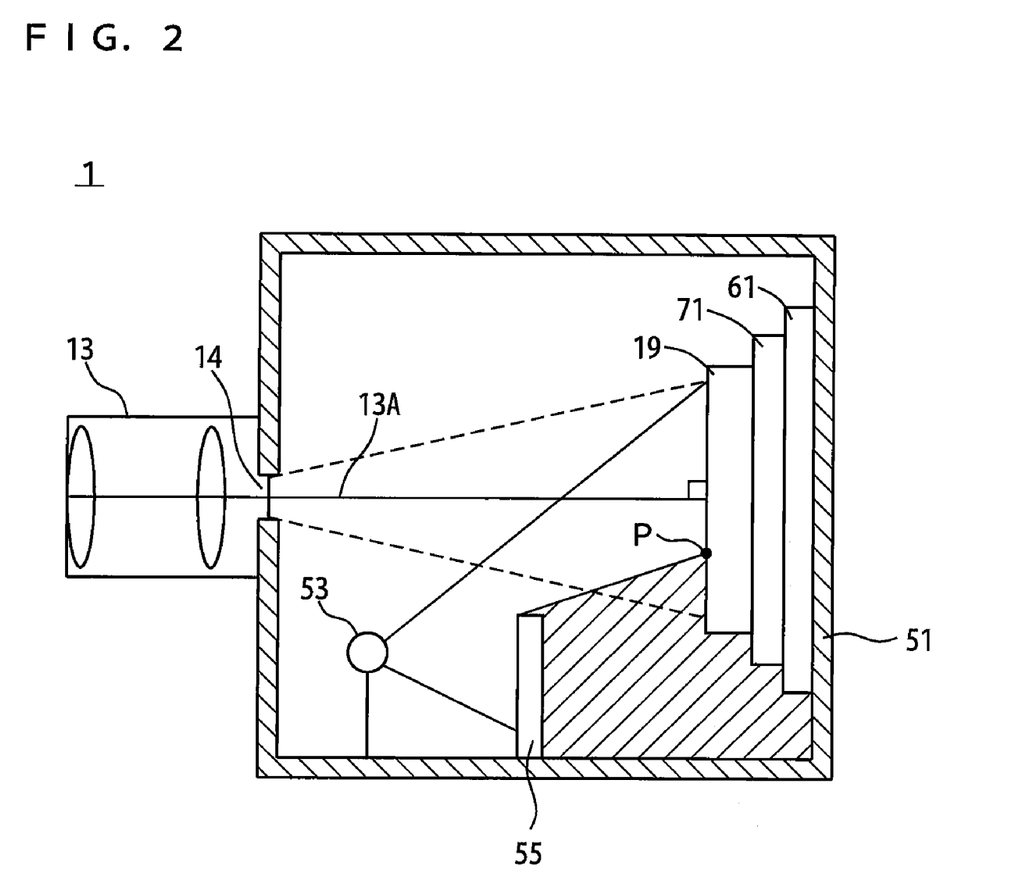
FIG. 2 is a cross-sectional view schematically showing the digital still camera in accordance with an embodiment of the present invention.

FIG. 2 is a cross-sectional view schematically showing the digital still camera in accordance with an embodiment of the present invention. Referring to FIG. 2, digital still camera 1 includes a casing 51 serving as a base, lenses 13, and shutter 14 for blocking light entering the inside of casing 51 from lenses 13. Furthermore, arranged inside casing 51 are a light source (illumination portion) 53, a light-blocking plate (light-blocking portion) 55, an X stage 61 and a Y stage 71 (movement portion), and an image sensor (photoelectric transduction portion) 19.

Casing 51 has a hole. Shutter 14 is arranged at the hole. Lenses 13 are arranged at shutter 14 on the side opposite to casing 51. In a state in which shutter 14 is closed, entrance of light into casing 51 through lenses 13 is blocked. In a state in which shutter 14 is open, light passes through lenses 13 and the hole and enters the inside of casing 51.

Light source 53 and light-blocking plate 55 are fixed to casing 51, and their relative positions with respect to casing 51 are each invariable. In the shown example, light source 53 and light-blocking plate 55 are directly fixed to casing 51. However, light source 53 and light-blocking plate 55 may be connected indirectly with any other member interposed as long as their relative positions (directions and distances) with respect to casing 51 are fixed.

X stage 61 is connected to casing 51 such that it can move in parallel therewith. Y stage 71 is connected to X stage 61 on the side opposite to casing 51 such that it can move in parallel therewith. Image sensor 19 is mounted on Y stage 71 on the side opposite to X stage 61. Image sensor 19 has an image plane on which light entering casing 51 through lenses 13 forms an image, and the image plane is vertical to optical axis 13A of lenses 13. The direction in which X stage 61 moves relative to casing 51 is parallel to the image plane of image sensor 19, here, the direction vertical to the drawing sheet of the figure, and is referred to as the X-axis. The direction in which Y stage 71 moves relative to X stage 61 is parallel to the image plane of image sensor 19 and intersects the direction in which X stage 61 moves relative to casing 51. Here, the direction in which Y stage 71 moves relative to X stage 61 is perpendicular to the direction in which X stage 61 moves relative to casing 51, that is, the upward/downward direction in the figure, and is referred to as the Y-axis.

Y stage 71 can be moved by X stage 61 relative to casing 51 in the X-axis direction and image sensor 19 can be moved by Y stage 71 relative to casing 51 in the Y axis direction, so that image sensor 19 can move parallel to the image plane with its image plane kept vertical to the optical axis of lenses 13.

Light source 53 is fixed to casing 51 at a predetermined position. The predetermined position at which light source 53 is fixed to casing 51 is where at least part of light emitted from light source 53 reaches the image plane of image sensor 19. In this case, as image sensor 19 is movable relative to casing 51, light source 53 is arranged at a position where light emitted from light source 53 reaches the image plane when image sensor 19 is located anywhere in its movable range. It is noted that light source 53 is arranged so as not to block the path of light entering casing 51 through lenses 13 and reaching the image plane. Light emitted from light source 53 may be reflected, for example, by a reflector to reach image sensor 19, rather than reaching image sensor 19 directly.

Light-blocking plate 55 is fixed to casing 51 at a predetermined position. The predetermined position at which light-blocking plate 55 is fixed to casing 51 is set such that part of light emitted from light source 53 is interrupted and the shadow of light-blocking plate 55 is casted on the image plane of image sensor 19. In this case, as image sensor 19 is movable relative to casing 51, light-blocking plate 55 is arranged at a position where light emitted from light source 53 casts the shadow of light-blocking plate 55 on the image plane when image sensor 19 is located anywhere in its movable range. It is noted that light-blocking plate 55 is arranged so as not to interrupt the path of light entering casing 51 through lenses 13 and reaching the image plane.

Light emitted from light source 53 does not have to reach the entire image plane of image sensor 19. Light source 53 may be arranged at a position where light emitted from light source 53 reaches part of the image plane of image sensor 19, as long as the shadow of light-blocking plate 55 is casted on the image plane.

In a state in which shutter 14 is closed, light emitted from light source 53 is partially interrupted to cast the shadow of light-blocking plate 55 on the image plane of image sensor 19. In the figure, the outline of the shadow of light-blocking plate 55 casted on the image plane of image sensor 19 is represented by P. The position of the outline P with respect to casing 51 in the Y-axis direction does not change even when image sensor 19 moves in the Y-axis direction. On the other hand, when image sensor 19 moves in the Y-axis direction, the position of the outline P on the image plane is changed. Based on an image output by image sensor 19, digital still camera 1 detects the position of the outline P in the image and detects the relative position of image sensor 19 with respect to casing 51.

Figure 3:
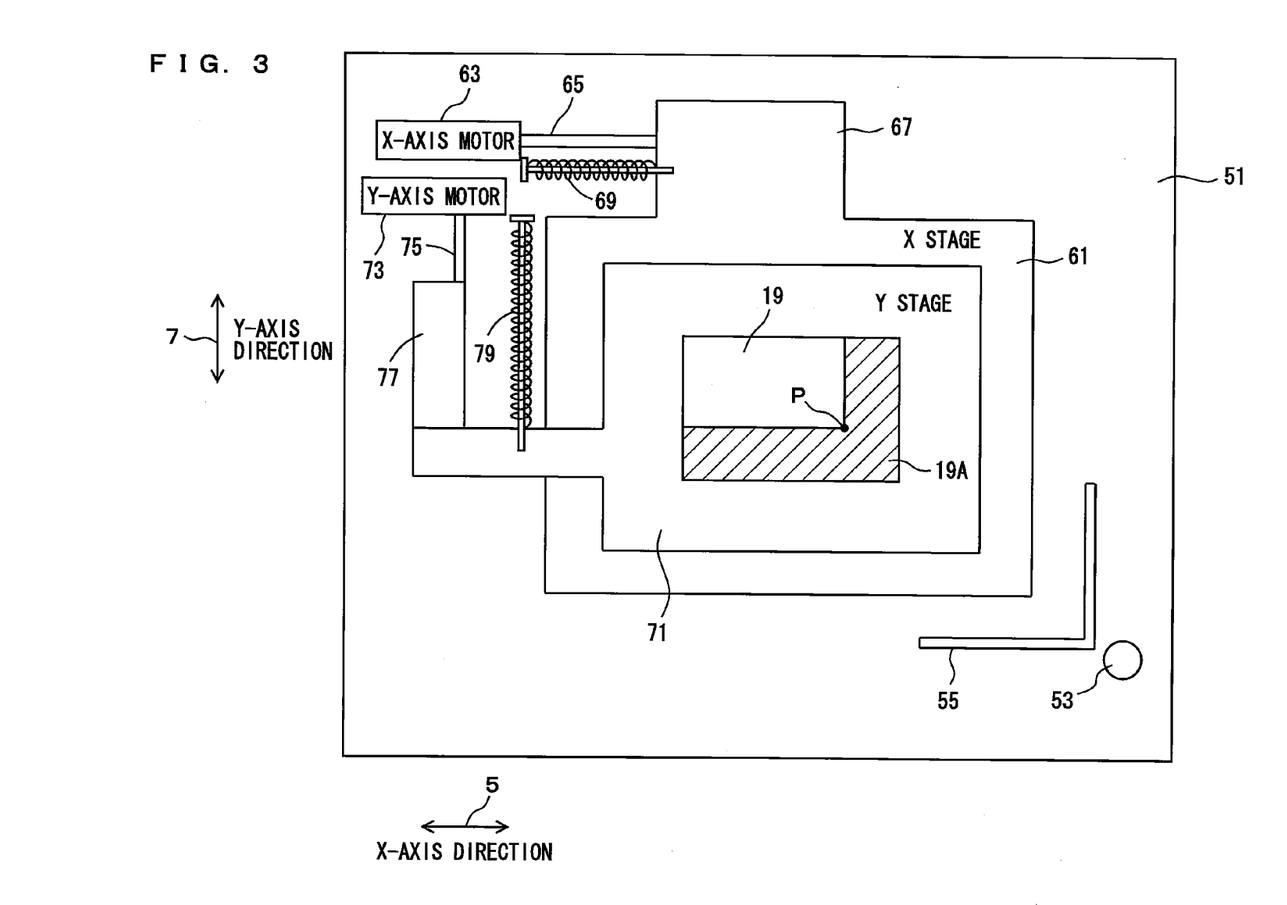
FIG. 3 is a plan view of the interior of a casing as viewed from lenses.

FIG. 3 is a plan view of the interior of the casing as viewed from lenses 13. Referring to FIG. 3, X stage 61 is connected to casing 51 to be movable in the X-axis direction shown by arrow 5. An X-axis motor 63 is fixed to casing 51 to rotate a screw 65 connected to the rotational shaft thereof. Screw 65 is screwed halfway into a motor nut 67 fixed to X stage 61. X-axis motor 63 is a stepping motor and has its rotational position controlled by control unit 11. Forward rotation or backward rotation of X-axis motor 63 rotates screw 65 forward or backward to move X stage 61 rightward (forward) or leftward (backward) along the X-axis.

A spring 69 has one end fixed to casing 51 and the other end connected to X stage 61 and pulls X stage 61 leftward along the X axis. The precision in positioning X stage 61 is increased by bringing one surface of the threads of screw 65 and one surface of the threads of motor nut 67 into contact with each other.

Y stage 71 is connected to X stage 61 to be movable in the Y-axis direction shown by arrow 7. A Y-axis motor 73 is fixed to casing 51 to rotate a screw 75 connected to the rotational shaft thereof. Y stage 71 is connected to a motor nut 77 to be movable in the X-axis direction. Screw 75 is screwed halfway into motor nut 77. Y-axis motor 73 is a stepping motor and has its rotational position controlled by control unit 11 as described later. Forward rotation or backward rotation of Y-axis motor 73 rotates screw 75 forward or backward to move Y stage 71 upward (positive direction) or downward (negative direction) along the Y-axis direction.

A spring 79 has one end fixed to casing 51 and the other end connected to Y stage 71 and pulls Y stage 71 upward along the Y axis. The precision in positioning Y stage 71 is increased by bringing one surface of the threads of screw 75 and one surface of the threads of motor nut 77 into contact with each other.

Light-blocking plane 55 is arranged between light source 53 and image sensor 19 and is formed of two planes perpendicular to each other. Specifically, light-blocking plate 55 is formed such that a shadow 19A including the outline generally parallel to each of the X-axis direction and the Y-axis direction is projected onto the image plane of image sensor 19 when light-blocking plate 55 is illuminated by light source 53.

Figure 4:
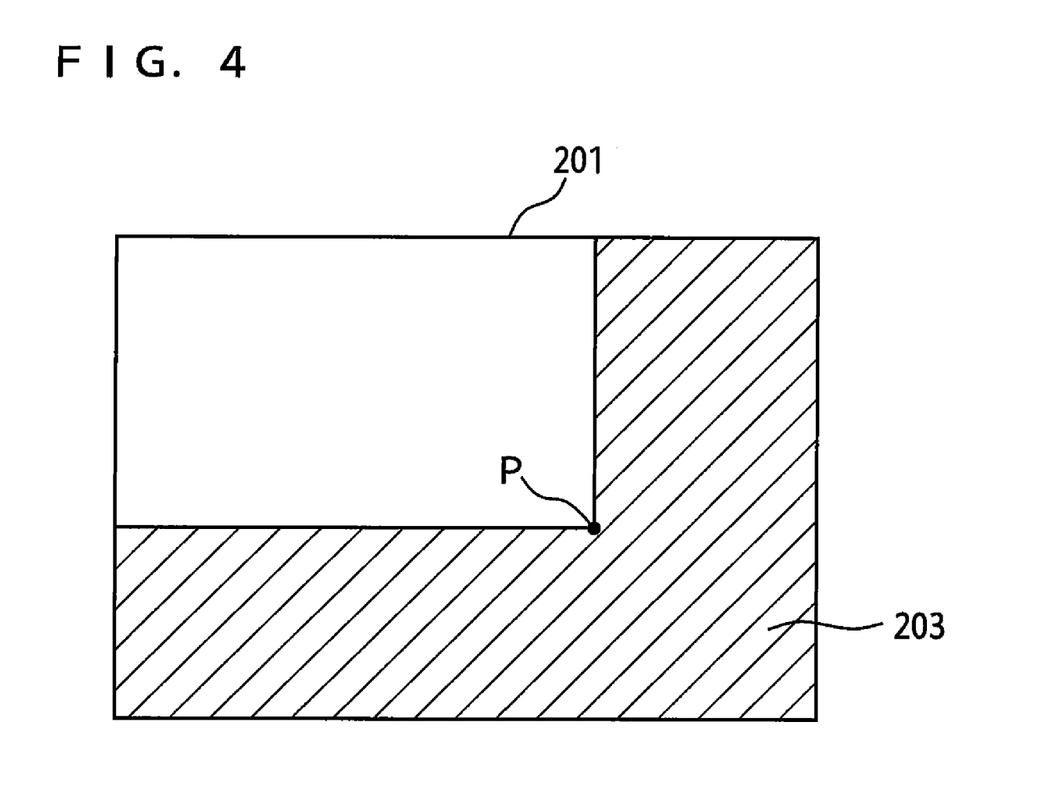
FIG. 4 illustrates an example of an image output by an image sensor.

FIG. 4 illustrates an example of the image output by the image sensor. The image shown in FIG. 4 is output by image sensor 19 as a result of photoelectric transduction in a state in which shutter 14 is closed and light source 53 emits light. Referring to FIG. 4, an image 201 includes an image 203 of the shadow of light-blocking plate 55. Image 203 is shown here with hatching. The luminance of image 203 is lower than the luminance of the other area. Image 203 has the outline including straight lines parallel to the X-axis and the Y-axis and including an intersection point P of the straight line parallel to the X-axis and the straight line parallel to the Y-axis.

The position of the pixel at the intersection point P in image 201 can be detected as coordinates by analyzing image 201. For example, a pixel of which value changes abruptly in one line in the X-axis direction is detected, and the X coordinate of the detected pixel is assumed as the X coordinate of the intersection point P. A pixel of which value changes abruptly in one line in the Y-axis direction is detected, and the Y coordinate of the detected pixel is assumed as the Y coordinate of intersection point P.

Figure 5:
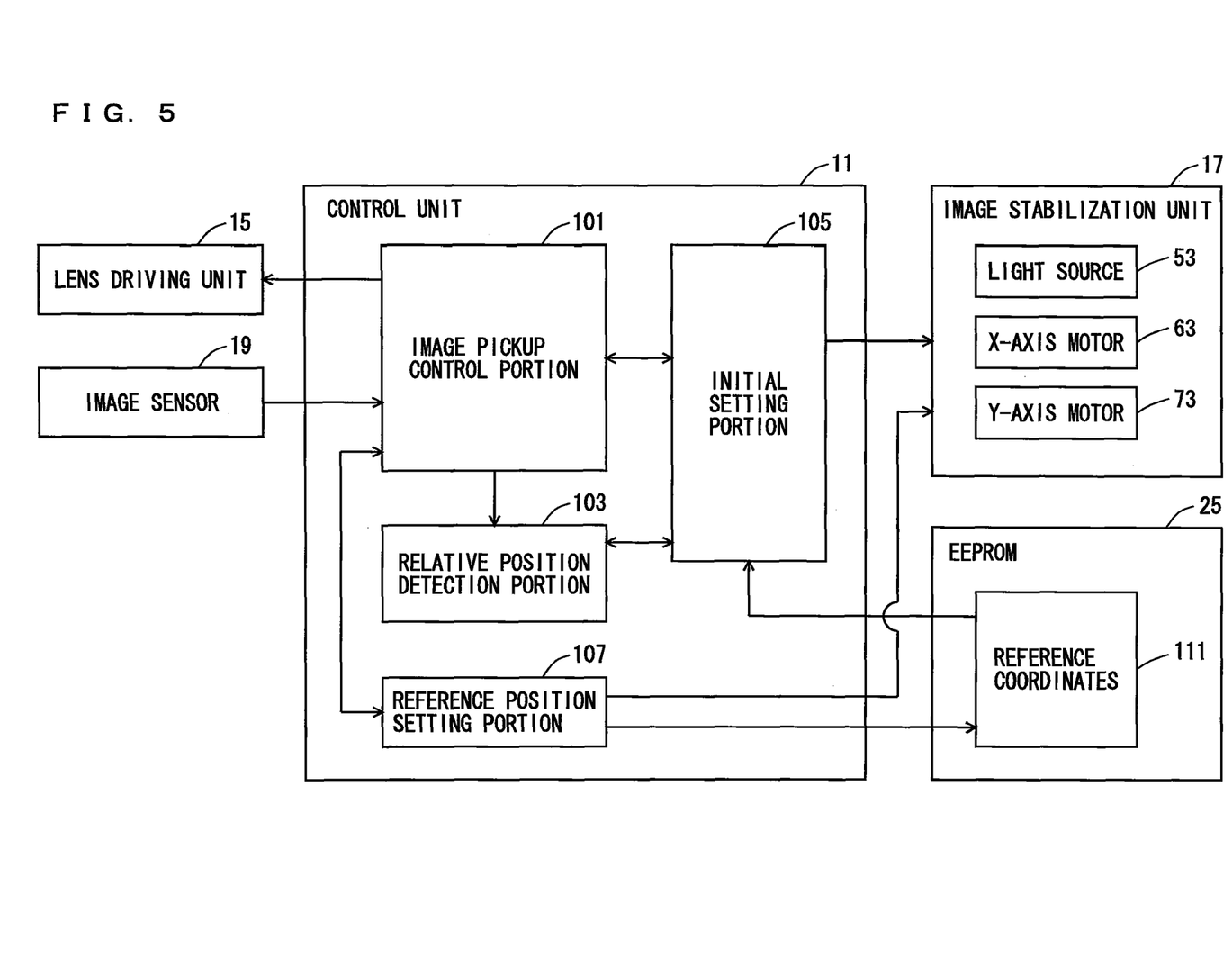
FIG. 5 is a functional block diagram showing an example of functions of a control unit.

FIG. 5 is a functional block diagram showing an example of functions of the control unit. The functions shown in FIG. 5 are implemented by control unit 11 by control unit 11 executing an image pickup program. The functions shown in FIG. 5 may be implemented by circuitry in place of control unit 11.

Referring to FIG. 5, control unit 11 includes an image pickup control portion 101 for controlling lens driving unit 15 and image sensor 19, a relative position detection portion 103 for detecting a relative position of image sensor 19 with respect to casing 51, an initial setting portion 105 for initializing the image stabilization unit, and a reference position setting portion 107 for setting a reference position.

EEPROM 25 stores reference coordinates 111. Reference coordinates 111 are stored into EEPROM 25 by reference position setting portion 107. Reference position setting portion 107 and reference position coordinates 111 will be detailed later. Reference coordinates 111 are the coordinates in a picked-up image when image sensor 19 is at the reference position. Here, the reference position is a relative position of image sensor 19 with respect to casing 51 and is located where the center of the image plane of image sensor 19 coincides with the optical axis of lenses 13.

Initial setting portion 105 initializes image stabilization unit 17 when digital still camera 1 is powered on or when the operation mode switches from a replay mode to an image pickup mode. Specifically, in order to move image sensor 19 to the reference position, the present relative position of image sensor 19 is detected. Image sensor 19 is moved to the reference position based on the difference between the detected relative position and the reference position. Further specifically, initial setting portion 105 outputs an image pickup instruction for initialization to image pickup control portion 101, outputs a relative position detection instruction to relative position detection portion 103, and controls image stabilization unit 17 such that light source 53 emits light for a prescribed time.

In response to the image pickup instruction for initialization input from initial setting portion 105, image pickup control portion 101 controls lens driving unit 15 to close shutter 14 and initializes image sensor 19. Then, after light source 53 emits light for a prescribed time, image pickup control portion 101 allows image sensor 19 to output an image signal. Accordingly, image sensor 19 transduces an optical image formed on the image plane by light emitted from light source 53 for a period between the initialization and the output of the image signal. Image pickup control portion 101 obtains the image signal output by image sensor 19 and outputs an image based on the image signal to relative position detection portion 103.

Relative position detection portion 103 detects a relative position of image sensor 19 with respect to casing 51, based on the image input from image pickup control portion 101. Image 201 shown in FIG. 4 is input from image pickup control portion 101. Image 201 includes image 203 of the shadow of light-blocking plane 55, and the outline of image 203 includes straight lines parallel to the X-axis and the Y-axis. Relative position detection portion 103 extracts from image 201 the intersection point P of the straight line parallel to the X-axis and the straight line parallel to the Y-axis and outputs the coordinates of P to initial setting portion 105 as the coordinates of the relative position. Here, the coordinates of the pixel at the upper left corner of image 201 is (0, 0).

Initial setting portion 105 reads out reference coordinates 111 stored in EEPROM 25, calculates the difference between reference coordinates 111 and the coordinates of the relative position input from relative position detection portion 103, calculates the amount of rotation of each of X-axis motor 63 and Y-axis motor 73 that is required to move image sensor 19 to the reference position, based on the difference, and outputs a movement instruction including each calculated amount of rotation to image stabilization unit 17.

The image stabilization unit rotates X-axis motor 63 by the amount of rotation of X-axis motor 63 as included in the movement instruction and rotates Y-axis motor 73 by the amount of rotation of Y-axis motor 73 as included in the movement instruction. Accordingly, image sensor 19 moves to the reference position.

Reference position setting portion 107 will now be described. Reference position setting portion 107 moves images sensor 19 to the reference position, which is a predetermined relative position with respect to casing 51, determines the reference coordinates, and stores the determined reference coordinates in EEPROM 25, in the adjustment process included in the production line for manufacturing digital still camera 1. Specifically, the adjustment process includes a jig for positioning digital still camera 1 and a test sheet arranged at a position fixed in advance with respect to the jig. The jig fixes digital still camera 1 at a position where the test sheet is included in the image pickup range of digital still camera 1. In the adjustment process, digital still camera 1 is positioned with respect to the jig and receives a reference image setting instruction. The reference image setting instruction may be input by the operator pressing a button of operation unit 35 allocated for the reference image setting instruction or may be input from a test computer, if any, connected to an external interface connected to control unit 11 of digital still camera 1.

In response to input of the reference image setting instruction, reference position setting portion 107 outputs an image pickup instruction to image pickup control portion 101 and receives an image from image pickup control portion 101. Image pickup control portion 101 picks up an image of the test sheet and outputs the electronic image of the reference image drawn on the test sheet, to reference position setting portion 107. The reference image includes, for example, cross lines. The test sheet is arranged in advance at a position where the intersection of cross lines of the reference image drawn thereon coincides with the optical axis of lenses 13 of digital still camera 1 fixed to the jig. In actuality, the intersection of cross lines of the reference image rarely coincides with the optical axis of lenses 13 of digital still camera 1 fixed to the jig, due to the precision of the jig, an error in manufacturing digital still camera 1, etc. Here, however, reference position setting portion 107 assumes, as the optical axis of lenses 13, the intersection of cross lines in the reference image output by image pickup control portion 101 as a result of picking up an image of the test sheet.

The center of the reference image defined by the center coordinate of the X-axis and the center coordinate of the Y-axis in the reference image corresponds to the center of image sensor 19. Reference position setting portion 107 outputs to image stabilization unit 17 an instruction including the difference between the coordinates of the center of the reference image and the coordinates of the intersection point of the cross lines in the reference image, for moving image sensor 19 to the reference position. As image stabilization unit 17 rotates X-axis motor 63 and Y-axis motor 73 in accordance with the instruction from reference position setting portion 107, image sensor 19 is moved to the reference position.

Although here the reference position is located where the center of image sensor 19 coincides with the optical axis of lenses 13, the center of the range over which image sensor 19 is movable in each of the X-axis direction and the Y-axis direction may be set as the reference position. In this case, the jig and the test sheet are unnecessary in the test step. For example, reference position setting portion 107 outputs a center position movement instruction to image stabilization unit 17 and allows image stabilization unit 17 to move image sensor 19 to the center of the movable range in each of the X-axis direction and the Y-axis direction. Specifically, image stabilization unit 17 rotates X-axis motor 63 forward until it cannot rotate, and thereafter image stabilization unit 17 rotates X-axis motor 63 backward until it cannot rotate. Half the number of rotations X-axis motor 63 rotates backward is determined as the number of rotations required to reach the center of the movable range in the X-axis direction. X-axis motor 63 is rotated forward by the determined number of rotations required to reach the center. Image stabilization unit 17 also rotates Y-axis motor 73, similarly to X-axis motor 63. When image sensor 19 is located at the center of the movable range in each of the X-axis direction and the Y-axis direction, the relative position of image sensor 19 with respect to casing 51 is the reference position.

If digital still camera 1 is designed such that the center of image sensor 19 coincides with the optical axis of lenses 13 when image sensor 19 is located at the center of the movable range in each of the X-axis direction and the Y-axis direction, the center of image sensor 19 coincides with the optical axis of lenses 13. However, in actuality, the center of image sensor 19 is shifted from the optical axis of lenses 13 due to an error in manufacturing or mounting X-stage 61 and Y-stage 71. Therefore, assuming that the center of image sensor 19 coincides with the optical axis of lenses 13 when image sensor 19 is located at the center of the movable range in each of the X-axis direction and the Y-axis direction, reference position setting portion 107 sets the relative position of image sensor 19 with respect to casing 51 as the reference position.

Here, it has been described that the center of the optical axis of lenses 13 or the center of the movable range of image sensor 19 is set as the reference position. However, the location where the quantity of light is maximum (the center of the quantity of light) may be set as the reference position.

After image sensor 19 moves to the reference position, reference position setting portion 107 outputs an image pickup instruction for initialization to image pickup control portion 101 and controls image stabilization unit 17 such that light source 53 emits light for a prescribed time.

In response to input of the image pickup instruction for initialization from reference position setting portion 107, image pickup control portion 101 controls lens driving unit 15 to close shutter 14 and initializes image sensor 19. Thereafter, after light source 53 emits light for a prescribed time, image pickup control portion 101 allows image sensor 19 to output an image signal. Accordingly, image sensor 19 transduces an optical image formed on the image plane by light emitted by light source 53 for a period from the initialization to the output of the image signal. Image pickup control portion 101 obtains the image signal output by image sensor 19 and outputs an image based on the image signal to reference position setting portion 107.

Reference position setting portion 107 determines the reference coordinates based on the image input from image pickup control portion 101. Image 201 shown in FIG. 4 is input from image pickup control portion 101. Image 201 includes image 203 of the shadow of light-blocking plate 55. The outline of image 203 includes straight lines parallel to the X-axis and the Y-axis. Relative position detection portion 103 extracts from image 201 intersection point P of the straight line parallel to the X-axis and the straight line parallel to the Y-axis and sets the coordinates of P as the reference coordinates for storage into EEPROM 25.

Figure 6:
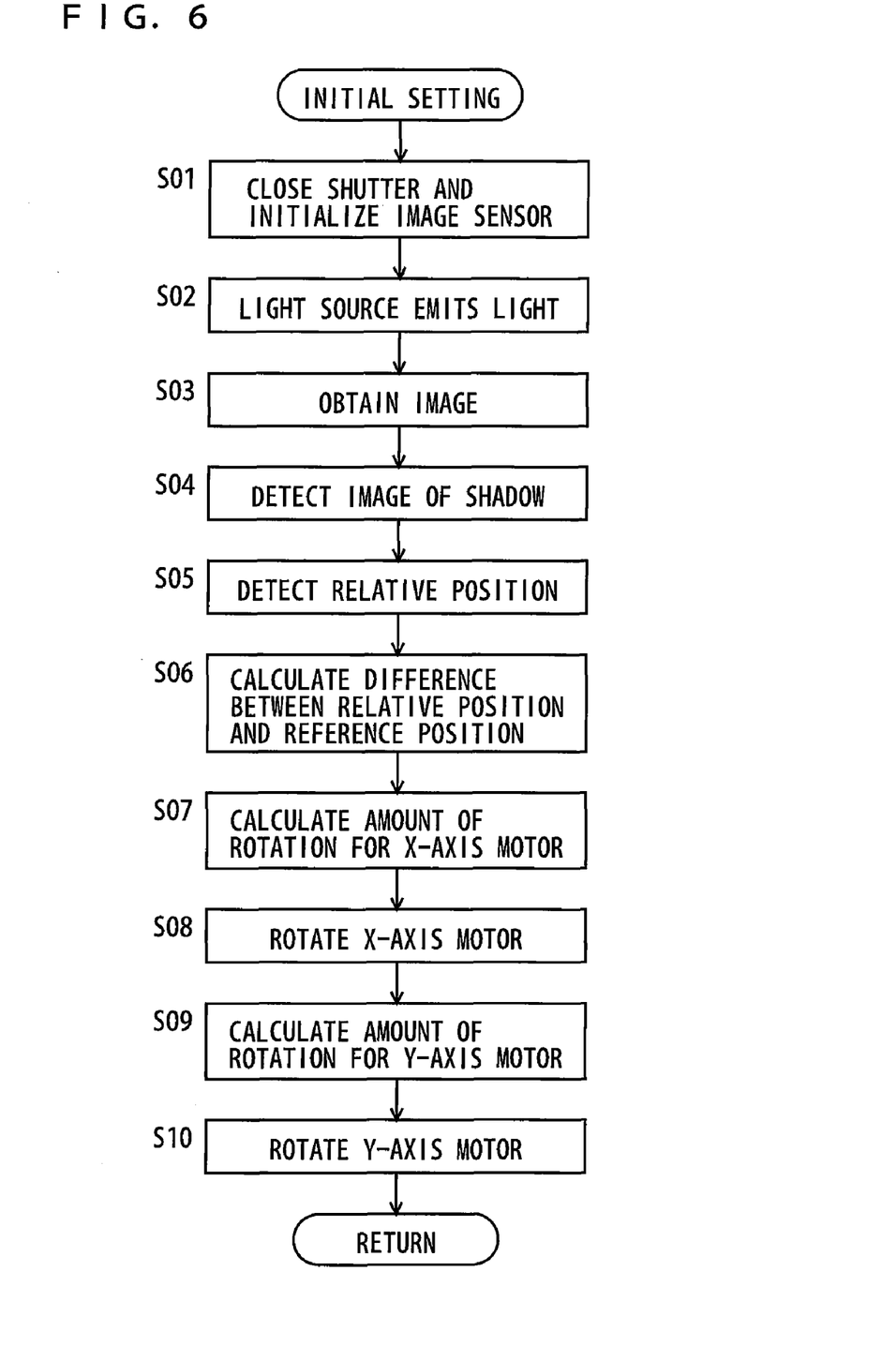
FIG. 6 is a flowchart showing an exemplary flow of an initial setting process.

FIG. 6 is a flowchart showing an exemplary flow of an initial setting process. The initial setting process is a process executed by control unit 11 by control unit 11 executing an image pickup program stored in EEPROM 25. The initial setting process is executed when digital still camera 1 is powered on or when the operation mode switches from a replay mode to an image pickup mode. Referring to FIG. 6, control unit 11 controls lens driving unit 15 to close shutter 14 and also initializes image sensor 19 (step S01). The initialization of image sensor 19 is a process of discharging electric charges stored by image sensor 19.

In the next step S02, image stabilization unit 17 is controlled such that light source 53 emits light. Accordingly, light emitted by light source 53 forms an image on the image plane, so that image sensor 19 transduces the optical image. After a prescribed time has passed, an image signal output by image sensor 19 is obtained (step S03). The image of the shadow is detected from an image based on the image signal (step S04). Specifically, the image based on the obtained image signal is image 201 shown in FIG. 4 in which an area with a low luminance value is detected as the image of the shadow. Then, pixels that change suddenly in image 201 are detected as the outline of image 203 of the shadow of light-blocking plate 55, and the intersection point P of the straight lines parallel to the X-axis and the Y-axis of the outline is detected as the coordinates of the relative position (step S05).

In the next step S06, the difference between the relative position and the reference position is calculated. Here, the differences between the coordinates of the relative position detected in step S05 and the reference coordinates read from EEPROM 25 are calculated.

Then, based on the difference in the X-axis direction of the differences calculated in step S06, the rotational direction and the amount of rotation of X-axis motor 63 required to move image sensor 19 to the reference position are calculated (step S07). Then, image stabilization unit 17 is controlled such that X-axis motor 63 is rotated in the rotational direction by the amount of rotation as calculated in step S07 (step S08).

In the next step S09, based on the difference in the Y-axis direction of the differences calculated in step S06, the rotational direction and the amount of rotation required to move image sensor 19 to the reference position are calculated. Then, image stabilization unit 17 is controlled such that Y-axis motor 73 is rotated in the rotational direction by the amount of rotation as calculated in step S09 (step S10).

Figure 7:
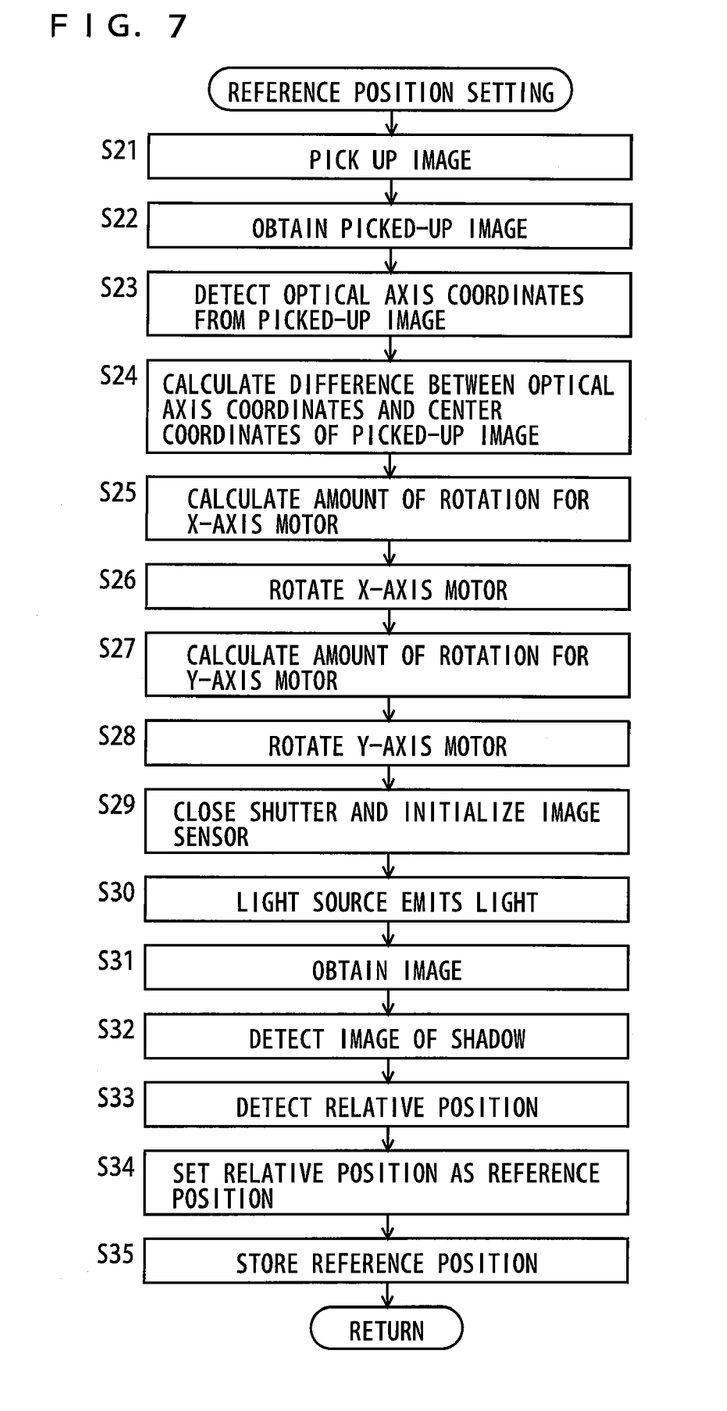
FIG. 7 is a flowchart showing an exemplary flow of a reference position setting process.

FIG. 7 is a flowchart showing an exemplary flow of a reference position setting process. The reference position setting process is a process executed by control unit 11 by control unit 11 executing an image pickup program stored in EEPROM 25. The reference position setting process is executed on condition that digital still camera 1 is fixed to a jig and a reference image setting instruction is input, in the adjustment process included in the production line for manufacturing digital still camera 1.

Referring to FIG. 7, in response to input of a reference image setting instruction, control unit 11 controls image pickup control portion 101 for image pickup (step S21). An optical image of the reference image drawn on the test sheet is formed on the image plane of image sensor 19 and is then converted into an electronic image whereby a picked-up image is obtained (step S22). Here, the reference image is an image including cross lines, and the test sheet is arranged in advance at a position where the intersection of the cross lines of the reference image drawn thereon coincides with the optical axis of lenses 13 of digital still camera 1 fixed to the jig.

In step S23, the coordinates of the optical axis in the picked-up image are detected. The coordinates of the pixel at the intersection point of the cross lines of the reference image in the picked-up image are detected as the coordinates of the optical axis. Then, the differences are calculated between the center coordinates of the reference image defined by the coordinate of the center in the X-axis and the coordinate of the center in the Y-axis in the picked-up image and the coordinates of the optical axis detected in step S23.

Then, based on the difference in the X-axis direction of the differences calculated in step S24, the rotational direction and the amount of rotation of X-axis motor 63 required to move image sensor 19 to the reference position are calculated (step S25). Then, image stabilization unit 17 is controlled such that X-axis motor 63 is rotated in the rotational direction by the amount of rotation as calculated in step S25 (step S26).

In the next step S27, based on the difference in the Y-axis direction of the differences calculated in step S24, the rotational direction and the amount of rotation of Y-axis motor 73 required to move image sensor 19 to the reference position are calculated. Then, image stabilization unit 17 is controlled such that Y-axis motor 73 is rotated in the rotational direction by the amount of rotation as calculated in step S27 (step S28).

The processing in step S29 to step S33 is the same as the processing in step S01 to step S05 shown in FIG. 6 and therefore a description thereof will not be repeated here. In step S34, the coordinates of the relative position detected in step S33 are set as the reference position. Then, the coordinates of the reference position are stored in EEPROM 25 (step S35), and the process then ends.

As described above, in digital still camera 1 in the present embodiment, when light source 53 emits light in a state in which shutter 14 is closed to block light traveling from lenses 13, light-blocking plate 55 interrupts part of the light, and the image of light-blocking plate 55 is thus projected onto the image plane of image sensor 19. Since the relative position of the image of light-blocking plate 55 projected onto the image plane with respect to casing 51 is invariable, the relative position of image sensor 19 with respect to casing 51 can be detected based on the image of light-blocking plate 55 included in the image output by image sensor 19. Therefore, image stabilization unit 17 can easily detect the relative position of image sensor 19 with respect to casing 51, thereby simplifying the initializing process.

<Modification>

In the foregoing embodiment, the relative position of image sensor 19 with respect to casing 51 is detected from the shadow of light-blocking plate 55 that is formed on the image plane of image sensor 19. Alternatively, light source 53 may emit spotlight onto the image plane of image sensor 19, and the center of the spotlight image may be detected as the coordinates of the relative position from the image based on the image signal output by image sensor 19. The image formed by spotlight on the image plane has any shape as long as its outline can be specified. Preferably, it is circular. When spotlight has a predetermined color, the image of spotlight can be extracted from the image based on the image signal output by image sensor 19 as a result of photoelectric transduction in a state in which spotlight is being emitted without shutter 14 being closed. In this case, the step of closing shutter 14 can be omitted.

In digital still camera 1 in the modified embodiment, light source 53 emits spotlight onto the image plane of image sensor 19 to cause an image of spotlight to be projected onto the image plane of image sensor 19. Since the relative position of the image of spotlight projected onto the image plane with respect to casing 51 is invariable, the relative position of image sensor 19 with respect to casing 51 can be detected based on the image of spotlight included in the image output by image sensor 19. Therefore, image stabilization unit 17 can easily detect the relative position of image sensor 19 with respect to casing 51, thereby simplifying the initializing process.

Although digital still camera 1 has been described as an example of the image pickup apparatus in the foregoing embodiment, it is needless to say that the present invention can be understood as an image pickup method for executing the initial setting process shown in FIG. 6 and the reference position setting process shown in FIG. 7 and an image pickup program for allowing a computer to execute the image pickup method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image pickup apparatus comprising:
    a photoelectric transduction portion to transduce an optical image of a subject formed on an image plane through a lens to output an image signal;
    a movement portion provided between said photoelectric transduction portion and a base to move said photoelectric transduction portion relative to said base;
    an illumination portion placed at a predetermined position from said base to emit light onto said image plane of said photoelectric transduction portion in a state in which a shutter is closed to block light entering from said lens;
    a light-blocking portion placed at a predetermined position from said base to interrupt part of light from said illumination portion at between said illumination portion and said image plane;
    an adjustment image obtaining portion to obtain an image signal output by said photoelectric transduction portion as a result of photoelectric transduction, in a state in which said illumination portion emits light; and
    a relative position detection portion to detect a relative position of said photoelectric transduction portion with respect to said base, based on an image of said light-blocking portion that is included in an image based on said obtained image signal.

2. The image pickup apparatus according to claim 1, wherein said movement portion includes an initial setting portion to move said photoelectric transduction portion to a reference position that is a predetermined relative position with respect to said base, based on the relative position detected by said relative position detection portion.

3. The image pickup apparatus according to claim 1, wherein
    said movement portion moves said photoelectric transduction portion in two directions that are parallel to the image plane of said photoelectric transduction portion and cross each other, and
    said light-blocking portion is shaped such that, when projected on said photoelectric transduction portion by said illumination portion, an image including an outline generally parallel to each of said two directions is projected onto said image plane of said photoelectric transduction portion.

4. The image pickup apparatus according to claim 1, wherein said relative position detection portion detects a position of a point at which two lines of an outline of said image of said light-blocking portion that is projected onto said image plane cross each other.

5. The image pickup apparatus according to claim 1, further comprising:
    an initial setting image obtaining portion to pick up a reference image arranged at a predetermined position with respect to said image pickup apparatus and to obtain an image signal output by said photoelectric transduction portion;
    a reference position determination portion to determine a reference position based on said reference image included in an image based on said obtained image signal; and
    a reference position storage portion to store said determined reference position.

6. The image pickup apparatus according to claim 1, wherein said illumination portion and said light-blocking portion are each arranged at a position where a path of light reaching said image plane through said lens is not interrupted.

7. An image pickup apparatus comprising:
    a photoelectric transduction portion to transduce an optical image of a subject formed on an image plane through a lens to output an image signal;
    a movement portion provided between said photoelectric transduction portion and a base to move said photoelectric transduction portion relative to said base;
    a spotlight illumination portion placed at a predetermined position from said base to emit spotlight onto said image plane of said photoelectric transduction portion in a state in which a shutter is closed to block light entering from said lens;
    an adjustment image obtaining portion to obtain an image signal output by said photoelectric transduction portion as a result of photoelectric transduction, in a state in which said spotlight illumination portion emits spotlight; and
    a relative position detection portion to detect a relative position of said photoelectric transduction portion with respect to said base, based on an image of spotlight included in an image based on said obtained image signal.

8. The image pickup apparatus according to claim 7, wherein said movement portion includes an initial setting portion to move said photoelectric transduction portion to a reference position that is a predetermined relative position with respect to said base, based on said relative position detected by said relative position detection portion.

9. The image pickup apparatus according to claim 7, further comprising:
- an initial setting image obtaining portion to pick up a reference image arranged at a predetermined position with respect to said image pickup apparatus and to obtain an image signal output by said photoelectric transduction portion;
- a reference position determination portion to determine a reference position based on said reference image included in an image based on said obtained image signal; and
- a reference position storage portion to store said determined reference position.

10. The image pickup apparatus according to claim 7, wherein said spotlight illumination portion is arranged at a position where a path of light reaching said image plane through said lens is not interrupted.

11. A reference position detection method executed in an image pickup apparatus,
- said image pickup apparatus including
  - a photoelectric transduction portion to transduce an optical image of a subject formed on an image plane through a lens to output an image signal,
  - a movement portion provided between said photoelectric transduction portion and a base to move said photoelectric transduction portion relative to said base,
  - an illumination portion placed at a predetermined position from said base to emit light onto said image plane of said photoelectric transduction portion in a state in which a shutter is closed to block light entering from said lens, and
  - a light-blocking portion placed at a predetermined position from said base to interrupt part of light from said illumination portion at between said illumination portion and said image plane,
- said method comprising the steps of;
- obtaining an image signal output by said photoelectric transduction portion as a result of photoelectric transduction in a state in which said illumination portion emits light; and
- detecting a relative position of said photoelectric transduction portion with respect to said base, based on an image of said light-blocking portion that is included in an image based on said obtained image signal.

12. The reference position detection method according to claim 11, further comprising the step of moving said photoelectric transduction portion to a reference position that is a predetermined relative position with respect to said base, based on said relative position detected in said step of detecting a relative position.

13. The reference position detection method according to claim 11, wherein
- said movement portion moves said photoelectric transduction portion in two directions that are parallel to said image plane of said photoelectric transduction portion and cross each other, and
- said light-blocking portion is shaped such that, when projected onto said photoelectric transduction portion by said illumination portion, an image including an outline generally parallel to each of said two directions is projected onto said image plane of said photoelectric transduction portion.

14. The reference position detection method according to claim 11, wherein said step of detecting a relative position includes the step of detecting a position of a point at which two lines of an outline of an image of said light-blocking portion that is projected onto said image plane cross each other.

15. The reference position detection method according to claim 11, further comprising the steps of:
- picking up a reference image arranged at a predetermined position with respect to said image pickup apparatus and obtaining an image signal output by said photoelectric transduction portion;
- determining a reference position based on said reference image included in an image based on said obtained image signal; and
- storing said determined reference position.

16. The reference position detection method according to claim 11, wherein said illumination portion and said light-blocking portion are each arranged at a position where a path of light reaching said image plane through said lens is not interrupted.

* * * * *